United States Patent [19]

Belttari

[11] Patent Number: 4,582,457
[45] Date of Patent: Apr. 15, 1986

[54] ADJUSTABLE BORING BAR

[76] Inventor: Stanley C. Belttari, 4451 Cedar, W. Bloomfield, Mich. 48033

[21] Appl. No.: 560,548

[22] Filed: Dec. 12, 1983

[51] Int. Cl.$^4$ .......................................... B23B 29/034
[52] U.S. Cl. .................................... 408/159; 408/153; 408/181; 408/187
[58] Field of Search ............... 408/147, 151, 158, 153, 408/159, 160, 161, 162, 163, 164, 177, 180, 181, 185, 187

[56] References Cited

U.S. PATENT DOCUMENTS

| | | | |
|---|---|---|---|
| 2,369,875 | 2/1945 | Wanelik | 408/159 X |
| 2,767,412 | 10/1956 | Berkey | 408/158 X |
| 2,848,912 | 8/1958 | Kalat | 408/153 X |
| 3,299,749 | 1/1967 | Koppelman | 408/158 X |
| 4,398,854 | 8/1983 | Pape et al. | 408/153 X |

*Primary Examiner*—Gil Weidenfeld
*Assistant Examiner*—Glenn L. Webb
*Attorney, Agent, or Firm*—Charles W. Chandler

[57] ABSTRACT

An adjustable boring bar is disclosed having a hollow case with an integral shank and a tool supporting nose receivable in the case. An adjusting pin is mounted on the case and threadably received in the nose such that it can be pivoted between adjusted positions, and precisely moved between lateral positions in the case. A draw pin in the case passes through a lateral opening in the nose for preventing removal of the nose from the case. A collar locks the draw pin in a locking position. The position of the tool can be adjusted longitudinally, transversely, and pivotally with respect to the shank.

13 Claims, 6 Drawing Figures

ADJUSTABLE BORING BAR

BACKGROUND OF THE INVENTION

This invention is related to a boring bar, and more particularly to means for supporting a cutting tool such that its position can be adjusted both longitudinally and laterally as well as pivoted to achieve a desired cutting geometry.

Various methods are known in the prior art for attaching cutters to a boring bar. However, one of the problems in using such a cutting tool is in precisely adjusting the position of the cutting tool relative to the workpiece.

SUMMARY OF THE INVENTION

The broad purpose of the present invention is to provide an improved adjustable boring bar in which the tool can be precisely adjusted transversely of the longitudinal axis of the boring bar and, in addition, can be pivoted to a precise position on a threaded fastener mounted on the boring bar case.

The case is adapted to accept interchangeable noses having either standard or special cutting tools.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
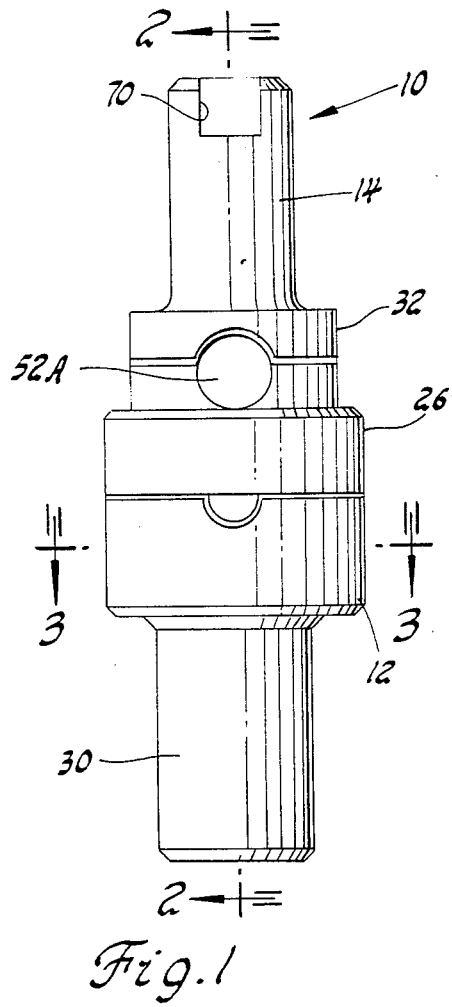
FIG. 1 is a view of a boring bar illustrating the preferred embodiment of the invention.
Figures 5, 6:
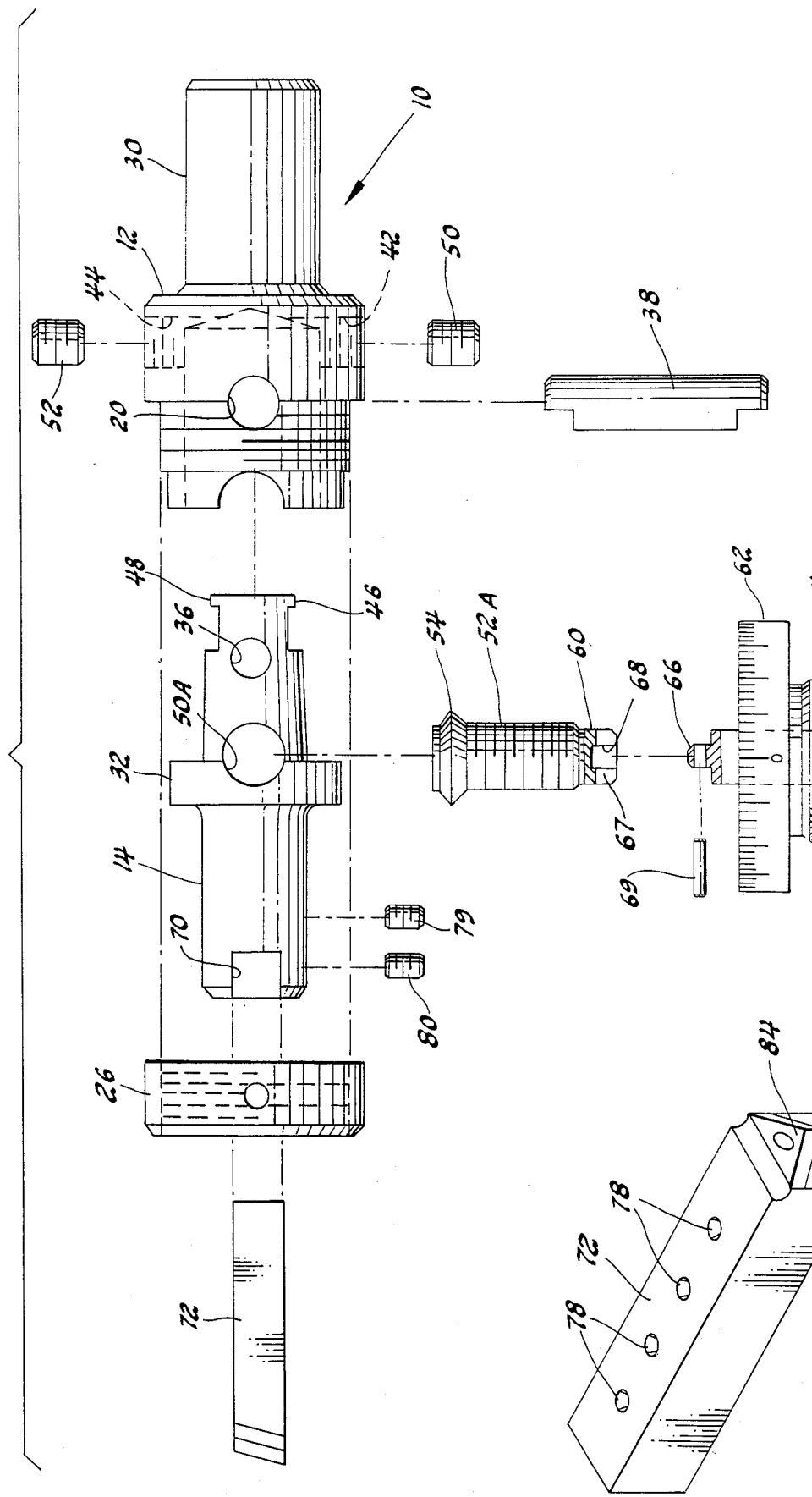
FIG. 5 is an exploded view of the preferred boring bar.
FIG. 6 is a perspective view of a preferred cutting tool cartridge.

Referring to the drawings, FIGS. 1 and 5 illustrate a preferred boring bar 10 comprising case 12 connected to an elongated tool holder nose 14. The case has a hollow construction with opening 16 for receiving the nose. The case also has a longitudinal axis 18, and a pair of openings 20 and 22 aligned along an axis transverse to axis 18.

The open end of the case is threaded at 24 for receiving collar 26.

The case has a straight shank 30, however, it could have a tapered shank.

The nose has an annular shoulder 32 about its midsection, and a locking section 34 receivable in opening 16 of the case. The length of the locking section, from the shoulder to the lower end of the nose, is less than the depth of opening 16. The locking section has an opening 36 between and aligned with openings 20 and 22.

Draw pin 38 is received in openings 20, 36 and 22. The mid-section of the draw pin is thicker than its ends. The opposite ends of the draw pin are received in openings 20 and 22 and prevent removal of the nose from the case.

Figure 2:
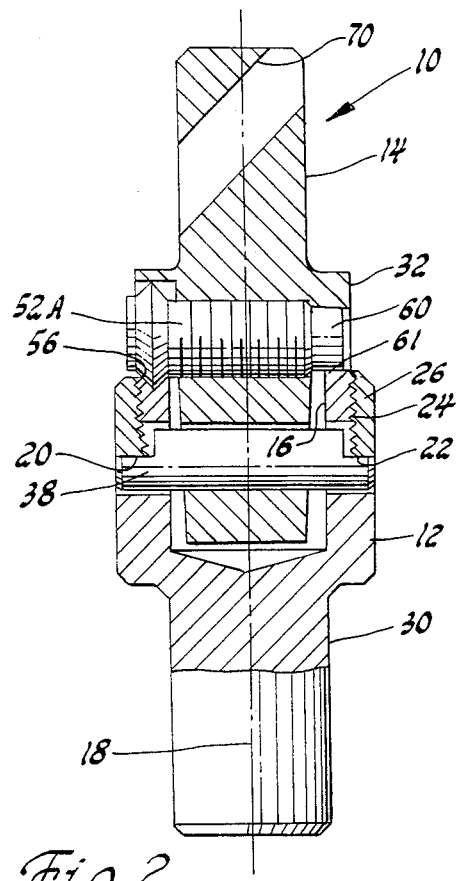
FIG. 2 is a longitudinal section view of the preferred boring bar with the lead screw handle removed, as seen along lines 2—2 of FIG. 1.

Collar 26 is mounted on threaded portion 24 of the case and engages the outer ends of the draw pin as viewed in FIG. 2.

Figure 3:
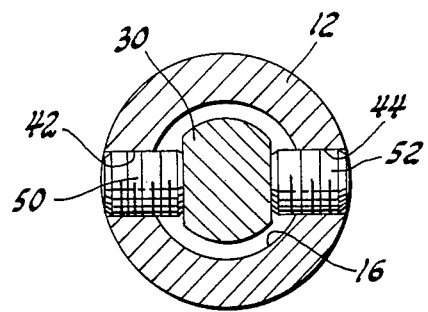
FIG. 3 is a view as seen along lines 3—3 of FIG. 1.

Referring to FIGS. 3 and 5, the case has a second pair of threaded openings 42 and 44, aligned with one another and located at 90° with respect to openings 20 and 22 in the shank. Openings 42 and 44 are disposed on opposite sides of a pair of shoulders 46 and 48 on the nose, as best viewed in FIG. 5. A pair of threaded fasteners 50 and 52 are received in openings 42 and 44, respectively, to engage shoulders 46 and 48. The two threaded fasteners are adjusted to locate the lateral position of the bottom end of the nose.

The nose also has a threaded opening 50A formed along an axis parallel to opening 36. Lead screw 52A is received in threaded opening 50A. As best illustrated in FIG. 5, one end of the lead screw has an integral shoulder 54. A portion of shoulder 54 is received in a semi-circular groove 56 formed in the outer edge of opening 16. Referring to FIG. 2, groove 56 has a V-shaped cross-section accommodating the V-shaped configuration of shoulder 54, so that the lead screw can be rotated with shoulder 54 slideably engaged in groove 56. The opposite end 60 of the lead screw is slideably mounted in semi-circular pocket 61 on the outer edge of case opening 16. The arrangement is such that as the lead screw is rotated, the nose is moved toward either one side or the other of the case.

When both collar 26 and threaded fasteners 50 and 52 have been loosened, the nose can be pivoted about the lead screw.

Referring to FIG. 5, gage member 62, having handle 64, has a small round pin 66 received in opening 68 of the lead screw. A roll pin 69 is carried on pin 66 and received in slot 67 to rotate the lead screw to adjust the lateral position of the nose in the case.

Figure 4:
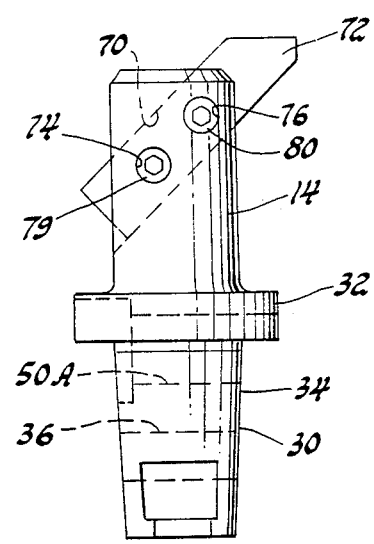
FIG. 4 is a view of the boring bar rotated 90° from the position of FIG. 1 and showing the nose supporting a cutting tool.

The outer end of the nose has a square tool-receiving opening 70 for holding insert cartridge 72. The nose has a pair of threaded openings 74 and 76, best illustrated in FIG. 4, for receiving a pair of set screws 79 and 80 which engage the insert cartridge to lock it in position.

Referring to FIG. 6, the insert cartridge has a plurality of spaced conical openings 78. Selected openings 78 receive set screws 79 and 80 to pre-set the tool position with respect to the longitudinal axis of the shank. A standard, triangular, indexible insert 84 is mounted on the cartridge.

Thus, it can be understood that I have described an improved boring bar in which the cutting tip of the insert cartridge can be very precisely located with respect to a workpiece. The lateral position of the cartridge with respect to the shank is very precisely adjusted by the load screw. The cutting tip can also be adjusted by pivoting the end of the nose inside the case by appropriately adjusting threaded fasteners 50 and 52.

In use, the locking section of the nose is received in the case and the draw pin inserted in opening 36. The lateral position of the tool is adjusted by rotating gauge handle 64 to precisely position the nose within opening 16. The pivoted position of the nose is then located by adjusting threaded fasteners 50 and 52. Collar 26 is then tightened down on the ends of the draw pin to firmly lock the nose to the case.

Other types of tools can be inserted in the nose such as a standard TSE boring tool.

Having described my invention, I claim:

1. An adjustable boring bar, comprising:
    a hollow tool holder case having a cylindrical wall with external, annular, threaded means, a first opening, and a pair of aligned pin-receiving openings on opposite sides of said cylindrical wall adjacent said threaded means;
    an elongated tool holder, having a nose at one end thereof, and a shank at the opposite end thereof, the shank having a first shank opening, and being receivable in the first opening of the case to a position in which the first shank opening is aligned and between the pair of aligned pin-receiving openings;
    a draw pin receivable in the first shank opening and said pair of pin-receiving openings along a first path of motion transverse to the longitudinal axis of the tool holder;
    the tool holder having a threaded opening formed along a second opening transverse to the longitudinal axis of the tool holder;
    a lead screw having threaded means, the lead screw being threadably received in the threaded opening of the tool holder to a position in which the ends of the lead screw extend beyond the sides of the shank;
    mounting means on the opposite sides of the tool holder case wall for rotatably receiving the ends of the lead screw as the shank of the tool holder is being received in the case to a position in which the tool holder is movable to an adjusted position in said second opening according to the rotated position of the lead screw with respect to the case;
    a collar threadably mounted on the annular threaded means of the case to engage the ends of the draw pin to bias the tool holder toward the threaded means on one side of the lead screw to lock the tool holder in a cutting position with respect to the case; and
    a cutting tool mounted on the nose of the tool holder.

2. A boring bar as defined in claim 1, in which the shank of the tool holders is pivotal about the lead screw at such times as the collar is spaced with respect to the draw pin, and including screw means mounted on the case engagable with the shank to lock the shank against pivotal motion.

3. A boring bar as defined in claim 1, in which the collar is engageable with the draw pin to bias the ends of the lead screw toward the mounting means on the case to prevent backlash.

4. A boring bar as defined in claim 2, in which the locking means comprises a set screw threadably mounted on the case adjacent the tool holder.

5. A boring bar as defined in claim 1, in which the draw pin has a mid-section with a diameter thicker than the ends of the draw pin to form a step adjacent at least one end of the draw pin, and wherein the collar engages the draw pin so as to be disposed in said first path of motion to prevent removal of the draw pin with respect to the pin-receiving openings.

6. A boring bar as defined in claim 1, in which the mounting means on the tool holder case include a V-shaped groove, and one end of the lead screw has an enlarged head with a V-shaped section adapted to be seated in the V-shaped groove.

7. An adjustable boring bar as defined in claim 1, in which the tool holder nose has an opening for receiving the cutting tool, the tool holder is elongated, and the tool holder is pivotal about the longitudinal axis of the lead screw with respect to the case, the lead screw being mounted on the case such that the longitudinal axis of the lead screw and the tool are disposed in a common plane.

8. A boring bar as defined in claim 1, in which the tool holder is movable from a first adjusted position to a second adjusted position along the draw pin and transversely to the longitudinal axis of the tool holder.

9. A boring bar as defined in claim 4, including a lead screw mounted on the case, and threadably engaged with the tool holder to move it transversely to the longitudinal axis of the nose.

10. A boring bar as defined in claim 9, in which the tool holder is pivotal about the lead screw with respect to the case.

11. A boring bar as defined in claim 9, in which the lead screw is connected to the tool holder in a position between the cutting tool and the draw pin such that the cutting tool is movable in an arc from a first adjusted position to a second adjusted position about the axis of the lead screw, depending upon a predetermined cutting geometry, and including locking means engaging the tool holder and mounted on the case for preventing motion of the tool holder from said second adjusted position.

12. A boring bar as defined in claim 11, in which the locking means comprises a pair of set screws threadably mounted on the case on opposite sides of the shank.

13. A boring bar as defined in claim 1, including means on the tool holder for supporting the tool in an adjusted, longitudinal position.

* * * * *